United States Patent [19]

Del Medico et al.

[11] 4,316,257
[45] Feb. 16, 1982

[54] DYNAMIC MODIFICATION OF SPATIAL DISTORTION CORRECTION CAPABILITIES OF SCINTILLATION CAMERA

[75] Inventors: Anthony P. Del Medico, Niles; Roger E. Arseneau, Arlington Heights, both of Ill.

[73] Assignee: Siemens Gammasonics, Inc., Des Plaines, Ill.

[21] Appl. No.: 96,182

[22] Filed: Nov. 20, 1979

[51] Int. Cl.³ .................. G06F 15/42; G06K 9/00
[52] U.S. Cl. ............................ 364/527; 364/571; 364/515; 364/577; 250/363 R; 250/363 S
[58] Field of Search ............ 364/527, 525, 571, 573, 364/577, 515, 414; 250/363 R, 363 S

[56] References Cited

U.S. PATENT DOCUMENTS

| | | | |
|---|---|---|---|
| 3,745,345 | 7/1973 | Muehllehner | 250/363 R |
| 3,872,434 | 3/1975 | Du Vall et al. | 340/146.3 AG |
| 4,157,533 | 6/1979 | Du Vall | 340/146.3 AG |
| 4,212,061 | 7/1980 | Knoll et al. | 364/515 X |

OTHER PUBLICATIONS

Removal of Gamma Camera Non-Linearity and Non-Uniformities Through Real-Time Signal Processing, G. F. Knoll, et al, Conference on Nuclear Medicine, Paris, France, Jul. 1979.
Real-Time Correction of Radio-Isotope Camera Signals for Non Uniformity and Nonlinearity, Knoll et al, Journal of Nuclear Medicine, 19: 746, 1978 (abstract).
Digital Image Processing Applied to Scintillation Images from Biomedical Systems, Varoutas et al, IEEE Transactions on Biomedical Engineering, vol. BME-24, No. 4, Jul. 1977.
Analysis and Correction of Spatial Distortions Produced by the Gamma Camera, Spector et al, Journal of Nuclear Medicine, 13: pp. 307-312, 1972.
The Non-Uniformity of Imaging Devices and Its Impact in Quantitative Studies, Todd-Pokropek et al, Medical Radionuclide Imaging, vol. 1, pp. 67-84, Vienna, IAEA, 1977.
Gamma-Camera Uniformity as a function of Energy and Count-Rate, Hasman et al, British Journal of Radiology, 49, pp. 718-722, 1976.
Scintillation Camera Nonuniformity: Effects on Cold Lesion Detectability, Guinen et al, International Journal of Nuclear Medicine, 12, pp. 785-791, 1971.
Field Flood Uniformity Correction: Benefits or Pitfalls, Padikal et al, Journal of Nuclear Medicine, pp. 653-656, 1976.
Pitfalls in Gamma Field Uniformity Correction, Hannan et al, British Journal of Radiology, 47: pp. 820-821, 1974.
Pitfalls in Gamma Camera Field Uniformity Correction, Jansson et al, British Journal of Radiology, 48: pp. 408-409, 1975.
Maximum a posteriori Estimation of Position in Scintillation Cameras, Gray et al, IEEE vol. NS-23, No. 1, Feb. 1976.

Primary Examiner—Edward J. Wise
Attorney, Agent, or Firm—Spellman, Joel & Pelton

[57] ABSTRACT

A method and apparatus for the dynamic modification of the spatial distortion correction capabilities of a scintillation camera having spatial distortion correction apparatus. The spatial distortion correction apparatus includes a memory having stored therein spatial distortion correction factors in a predetermined addressable format. During the on-line use of the scintillation camera, the spatial distortion correction apparatus transforms the image event coordinate position data from the scintillation camera in accordance with the stored distortion correction factors to provide corrected image event coordinate repositioning data. The spatial distortion correction modification apparatus and method provides modification of the corrected image event coordinate data in accordance with the respective energy levels of the image events to provide accurate spatial distortion correction characteristics for the actual energy levels of the image events. The scintillation camera is thus automatically and dynamically capable of correcting for spatial distortion effects for image events of different energy levels. Different energy levels of image events occur when the scintillation camera is utilized with energy sources having multiple energy levels or a different energy level than the energy level at which the stored spatial distortion correction factors were calculated. The spatial distortion correction modification apparatus provides operation without the alteration of the scintillation camera apparatus and without any change in the stored correction factors. In a preferred embodiment, a coordinate correction factor of the spatial distortion correction apparatus is modified in accordance with the energy level of each image event, the coordinate correction factor of the spatial distortion correction apparatus being combined with the image event coordinate position data to provide corrected image event coordinate data.

9 Claims, 7 Drawing Figures

CORRECTION INTERPOLATOR

DYNAMIC MODIFICATION OF SPATIAL DISTORTION CORRECTION CAPABILITIES OF SCINTILLATION CAMERA

BACKGROUND OF THE INVENTION

1. Field Of The Invention

The present invention relates generally to the field of scintillation cameras and more particularly to a method and apparatus for the dynamic modification of the spatial distortion correction capabilities of a scintillation camera having spatial distortion corrections apparatus.

2. Description Of The Prior Art

The correction of scintillation cameras and the like for the inherent spatial distortion characteristics of the apparatus is important to avoid localized image event compression or expansion in the image data that appears as erroneous variations in image intensity. Spatial distortions are the result of systematic errors in the positioning of scintillation events largely due to inaccuracies and non-linear output data in the image event position coordinate data of the scintillation camera detection apparatus. The spatial distortion characteristics vary as a function of the position of the occurrence of the image event on the camera face and thus the image events are not recorded in their correct location with respect to the overall image. Even though the displacement of individual events are not visually apparent in the image, spatial distortion causes noticable image field non-uniformities apparent as intensity variations in the image.

Various spatial distortion (linearity) correction apparatus and methods have been proposed to modify image event position coordinate data of scintillation cameras to provide corrected image event coordinate data of scintillation cameras. The proposed methods provide corrected image event coordinate position data and thus correct for the inherent spatial distortion characteristic of scintillation cameras including those known as the "Anger-type".

For example, spatial distortion correction methods and apparatus have been proposed as discussed and described in U.S. Pat. No. 3,745,345 which issued to G. Muehllenher on July 10, 1973; U.S. application Ser. No. 051,176 filed by E. W. Stoub et al on June 22, 1979; "Removal Of Gamma Camera Non-Linearity And Non-uniformities through Real-Time Signal Processing" by G. F. Knoll et al, presented at the July, 1979 Paris Conference on Nuclear Medicine; "On-Line Digital Methods For Correction Of Spatial And Energy Dependent Distortion Of Anger Camera Images" Shabason et al, *A Review Of Information Processing In Medical Imaging,* Fifth International Conference pp. 376–388, Vanderbilt University, Nashville, Tenn., June 27–July 1, 1977; and "Quantitative Studies With The Gamma Camera; Correction For Spatial And Energy Distortion," Soussaline et al, *A Review Of Information Processing In Medical Imaging,* Fifth International Conference, pp. 360–375, Vanderbilt University, Nashville, Tenn., June 27–July 1, 1977.

While the hereinbefore mentioned proposed methods and apparatus of the prior art are generally suitable for their intended use and describe arrangements to provide spatial distortion correction, these arrangements do not provide compensation or modification for the changes in the spatial distortion characteristics of the scintillation camera apparatus for image events having energy levels different from the energy level at which the spatial correction factors are calculated.

Thus, the prior art arrangements are neither optimized for nor are capable of compensating for spatial distortion characteristics that vary as a function of the image event energy level; whether the difference in energy levels are due to a source having a different energy level than that for which the correction factors were calculated or in the case of a source having multiple energy levels. Accordingly, the correction factors in the proposed prior art apparatus and methods require recalculation and storage for each energy level source with which the scintillation camera is to be utilized.

Other proposed prior art studies, methods and arrangements are directed to the problem of non-uniformity of scintillation camera response resulting in the energy response of the camera varying as a function of the image event position. These prior art studies, methods and arrangements are concerned with non-uniformity correction by the use of sliding energy window techniques, spatially variant adaptive energy discrimination, and image event energy signal modification.

For example, U.S. application Ser. No. 096,181 filed by R. Arseneau on Nov. 20, 1979 is directed to a method and apparatus for the correction of non-uniformities in energy response of scintillation cameras, the non-uniformity being the variation of energy response as a function of the image event position. The energy correction method determines energy correction factors in an off-line test, measurement and analysis phase and stores the determined energy correction factors in a memory of on-line energy correction apparatus. The on-line energy correction apparatus modifies the energy signal of each image event in accordance with the energy correction factor corresponding to the position of the image event. The corrected energy signals are then processed by an energy window analyzer of fixed width to decide whether to accept or reject a particular image event.

Another method for correcting for non-uniformity is described in "A New Method Of Correcting For Detector Non-Uniformity In Gamma Camera," Lapidus, *Raytheon Medical Electronics,* ST-3405, November, 1977, presented at a meeting of the Southeastern Chapter of the Society of Nuclear Medicine on Oct. 15, 1977. This method modifies the Z energy signal of an image event by reading out a stored correction factor corresponding to the image event position. The correction factors vary the width of the Z signal via a pulse width modulator to supply a variable pulse width Z signal. The display apparatus utilizes the variable pulse width Z signal to vary the intensity of the displayed image point on film.

However, the aforementioned spatial distortion corrections and non-uniformity correction systems do not provide modification of spatial distortion correction factors on the basis of the energy levels of the image event signals.

SUMMARY OF THE INVENTION

Accordingly, it is a principal object of the present invention to provide a method and apparatus for modifying the spatial distortion correction factors of spatial distribution correction apparatus of a scintillation camera in a dynamic and automatic manner in response to the energy level of the image event signals on an event by event basis.

Further, it is another object of the present invention to provide a method and apparatus for correcting the spatial distortion characteristics of a scintillation camera by modifying stored correction factors in accordance with the energy of image event signals accounting for the image events of different energy levels from a multiple energy level source of radiation and allowing the scintillation camera to automatically provide accurate spatial distortion correction characteristics when the scintillation camera is operated with radiation sources having different energy levels from the energy levels at which the stored correction factors were calculated.

Briefly and in accordance with one embodiment of the present invention, a method and apparatus is provided for the dynamic modification of the spatial distortion correction capabilities of a scintillation camera having spatial distortion correction apparatus. The spatial distortion correction apparatus includes a memory having stored therein spatial distortion correction factors in a predetermined addressable format. During the on-line use of the scintillation camera, the spatial distortion correction apparatus transforms the image event coordinate position data from the scintillation camera in accordance with the stored distortion correction factors to provide corrected image event coordinate repositioning data. The spatial distortion correction modification apparatus and method provides modification of the corrected image event coordinate data in accordance with the respective energy levels of the image events to provide accurate spatial distortion correction characteristics for the actual energy levels of the image events. The scintillation camera is thus automatically and dynamically capable of correcting for spatial distortion effects for image events of different energy levels. Different energy levels of image events occur when the scintillation camera is utilized with energy sources having multiple energy levels or a different energy level than the energy level at which the stored spatial distortion correction factors were calculated.

The spatial distortion correction modification apparatus provides operation without the alteration of the scintillation camera apparatus and without any change in the stored correction factors. In a preferred embodiment, a coordinate correction factor of the spatial distortion correction apparatus is modified in accordance with the energy level of each image event, the coordinate correction factor of the spatial distortion correction apparatus being combined with the image event coordinate position data to provide corrected image event coordinate data.

These and other objects of the present invention will become apparent from the following detailed description taken in conjunction with the accompanying drawing.

DETAILED DESCRIPTION OF THE PREFERRED EMBODIMENT

Figure 1:
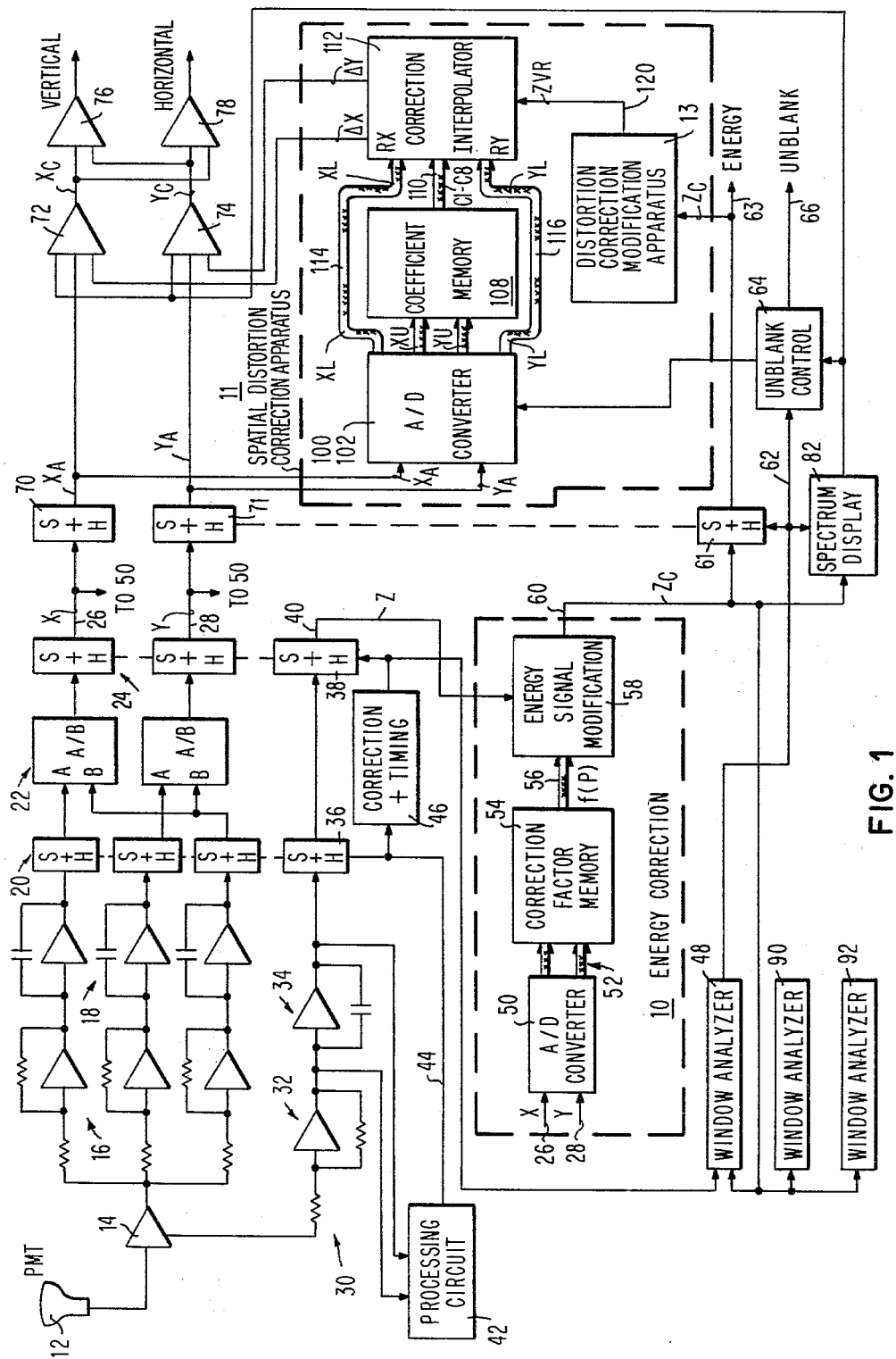
FIG. 1 is a schematic and block diagram representation of the improved spatial distortion correction method and apparatus of the present invention for a scintillation camera.

The on-line spatial distortion correction apparatus of the present invention utilizing the distortion correction modification apparatus and method of the present invention is referred to generally at 11 in FIG. 1 and is shown in connection with portions of a scintillation camera. The scintillation camera of FIG. 1 is of the general type that converts scintillation events into electrical signals that represent the position coordinates of the scintillation events and the energy of the scintillation event. The scintillation camera of FIG. 1 is an "Anger-type" camera well known in the scintillation camera field and is further described in U.S. Pat. Nos. 3,011,057; 3,745,345; and 3,984,689 to which reference may be made for a more detailed discussion of the general operation and detailed structure of a scintillation camera.

The spatial distortion correction apparatus 11 includes distortion correction modification apparatus 13 for modifying the distortion correction characteristics of the spatial distortion correction apparatus 11 in accordance with the energy level of the image events on an event-by-event basis as will be explained in more detail hereinafter. Portions of the spatial distortion correction apparatus 11 are generally similar to the image repositioning apparatus as described in U.S. application Ser. No. 06/051,176 filed by E. W. Stoub, et al. on June 22, 1979 to which reference may be made for a more detailed description of the function and operation of spatial distortion correction apparatus. The scintillation camera apparatus of FIG. 1 also includes on-line energy correction apparatus generally referred to at 10 for providing non-uniformity correction of the energy response of the scintillation camera as described in U.S. application Ser. No. 096,181 filed by R. E. Arseneau on Nov. 20, 1979.

Figure 2:
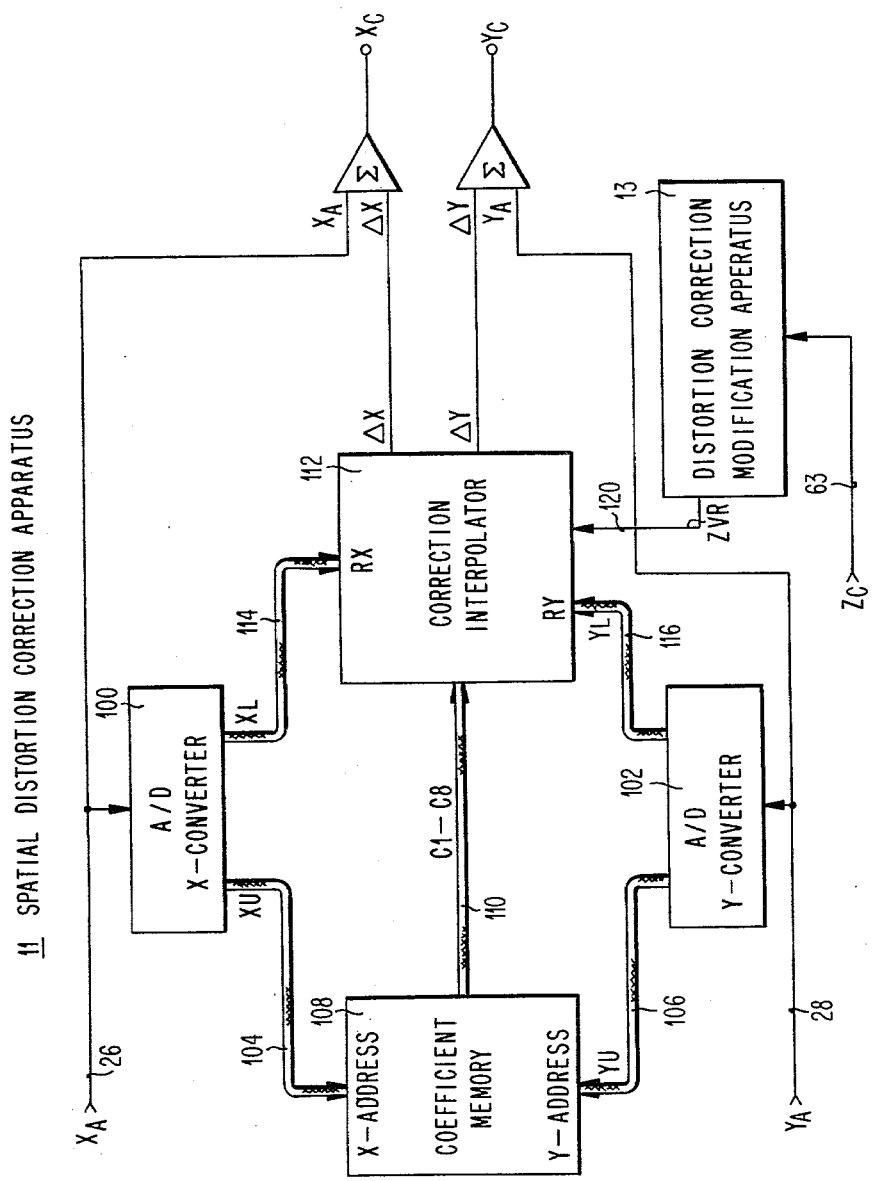
FIG. 2 is a block diagram of the spatial distortion correction apparatus and the dynamic modification apparatus of FIG. 1.

Considering now a brief discussion of the operation of the scintillation camera of FIG. 1, scintillation events occur as radiation such as gamma rays strike a scintillation crystal of the camera face. Photomultiplier tubes such as 12 of FIG. 1 are mounted in a predetermined array behind the scintillation crystal to convert the light energy of each scintillation event into an electrical pulse. In specific embodiments of scintillation cameras, a light pipe arrangement is provided between the crystal face and the photomultiplier tubes. In specific embodiments, 37 or 75 multiplier tubes as represented by PMT12 are provided in the predetermined array to detect the scintillation events across the face of the scintillation crystal as shown in FIGS. 1 and 2 of the aforementioned U.S. Pat. No. 3,745,345.

In accordance with the detector electronics of scintillation cameras, the pulse outputs of the photomultiplier tubes in the array are connected through preamplifier stages referred to at 14, sum and difference amplifier networks 16, integrator stages 18, sample and hold stages 20, multiplier stages 22 and sample and hold stages 24 as generally depicted in FIG. 1 to provide the X and Y position coordinates of each scintillation event.

The output of each photomultiplier tube in the array depends on the proximity of the respective photomultiplier tube to the scintillation event. The X coordinate output of the image event is referred to at 26 and the Y coordinate output of the image event is referred to at 28. The output of the photomultiplier tubes such as 12 are also connected to a Z signal or energy analysis circuit 30 that includes a summing amplifier stage 32, an integrator stage 34 and two sample and hold stages 36 and 38. The output of the sample and hold stage 38 generates at 40 an uncorrected Z signal representing the energy of each image event as it occurs. The Z energy signal circuit 30 also includes a processing circuit 42 connected to the outputs of the summing amplifier 32 and the integrator 34 and producing an output at 44 to the sample and hold stage 36 and a correction and timing stage 46. The energy processing circuit 42 provides the function of an input coarse analyzer, early dump and pile-up processor. The output of the correction and timing stage 46 is connected to the sample and hold stage 38 and a window analyzer stage 48. The X and Y position coordinate signals 26 and 28 and the Z energy signal 40 are connected to the energy correction apparatus 10.

The energy correction apparatus 10 includes an A to D converter stage 50 connected to the X and Y position coordinate outputs 26 and 28. The A to D converter stage 50 at output 52 converts each of the X and Y position coordinates for each image event into a digital output on a suitable number of digital control lines. The digital output 52 is connected to an address input of an energy correction factor memory 54 having stored therein a predetermined array of energy correction factors arranged to be addressed in accordance with position coordinate information representing areas or pixels of the camera face or image array. The energy correction factors are determined in an off-line test, measurement and analysis phase and stored in the energy correction factor memory 54 for use during the on-line diagnostic phase of the scintillation camera and associated apparatus. Reference may be made to the aforementioned U.S. application Ser. No. 096,181 filed by R. E. Arseneau on Nov. 20, 1979 for a more detailed discussion of the manner in which the correction factors are determined during the off-line test, measurement and analysis phase.

During the on-line diagnostic use of the scintillation camera, each image event via the X and Y coordinate signals 26 and 28 digitally addresses the energy correction factor memory 54 by means of the analog to digital converter 50. Thus, in response to each image event, the energy correction factor memory 54 generates an output at 56 on a predetermined number of digital control lines in a digital format that represents the predetermined energy correction factor to be appropriately applied to the energy signal at 40 that corresponds to the pixel area at which the respective image event occurred in the image area. The digital correction factor at the output 56 also referred to as f(P) is connected to the input of an energy signal modification stage 58 of the energy correction apparatus 10. The Z signal 40 is also connected as an input to the energy signal modification stage 58. In accordance with the digital correction factor f(P) at 56 and the analog Z (energy) signal at 40, the energy signal modification stage 58 at output 60 provides a corrected $Z_c$ energy signal in analog format. The corrected energy input $Z_c$ at 60 is connected to the input of a window analyzer 48.

The window analyzer 48 compares the level of the corrected energy signal $Z_c$ at 60 for each image event with a predetermined energy window defined by upper and lower energy bounds. As a result of the comparison, the window analyzer 48 produces a first, predetermined accept output signal at output 62 when a corrected energy signal 60 is within the energy window set in the analyzer 48. Correspondingly, the window analyzer 48 at output 62 generates a second predetermined reject signal at 62 when the energy signal is either above or below the energy window set in the window analyzer 48.

The output 62 of the window analyzer 48 is connected to an unblank control stage 64 that controls associated display and analysis apparatus over the unblank output 66. The unblank control stage 64 in response to the accept or reject signals on line 62 determines whether or not an image event is to be displayed or counted for analysis purposes.

The position coordinates of the event to be displayed are derived from the X and Y position coordinate information 26, 28 of each image event to control the displayed position of the image event in the image array produced by the associated display and analysis apparatus.

Specifically, the X position coordinate output 26 is connected through a sample and hold stage 70 as coordinate signal $X_A$ to one input of an X mixer and spectrum gate 72. Similarly, the Y position coordinate 28 is connected through a sample and hold stage 71 as coordinate signal $Y_A$ through one input of a Y mixer and spectrum gate 74.

The coordinate signals $X_A$ and $Y_A$ from the respective sample and hold stage 70, 71 are also provided as data inputs to the spatial distortion correction apparatus 11. Further, the corrected $Z_c$ energy signal 60 is connected through a sample and hold stage 61 at output 63 as the corrected energy signal $Z_c$ to the distortion correction modification apparatus 13 of the spatial distortion correction apparatus 11.

The spatial distortion correction apparatus 11 responds to the $X_A$ and $Y_A$ position coordinate signals of each image event and the $Z_c$ energy signal of each image event to provide spatial distortion position coordinate correction factors $\Delta X$ and $\Delta Y$ The correction factors $\Delta X$ and $\Delta Y$ are respectively connected to the mixer and spectrum gates 72 and 74 at second inputs to the gates 72 and 74.

The outputs of the mixer and spectrum gates 72 and 74 representing corrected position coordinate signals $X_c$ and $Y_c$ respectively are each connected to one input of each of two orientation gates 76 and 78. The outputs of the gates 76 and 78 are respectively connected to vertical and horizontal control lines that control the displayed position of the image event in the associated display and analysis apparatus. The orientation gates 76 and 78 provide for control of the orientation of the image by reversing the X and Y position data to reorient the image by 180° for diagnostic purposes.

A third input to each of the gates 72 and 74 is connected to the output of a spectrum display control stage 82 controlled by the output 62 of the window analyzer 48 and the corrected energy signal $Z_C$ at 60. The spectrum display stage 82 deactivates the gates 72 and 74 when it is desired to display the energy level $Z_c$ at 63.

The spatial distortion correction apparatus 11 in accordance with predetermined spatial distortion correction factors stored therein modifies the $X_A$ and $Y_A$ position coordinates of each image event to provide spatial distortion correction in the image display.

Thus, during the on-line diagnostic phase, the energy correction apparatus 10 modifies the uncorrected Z energy signal 40 from the scintillation camera 10 in accordance with a correction factor f(P) to minimize the effects of non-uniformity of energy response of the scintillation camera, as a function of image event position about the camera face. By correcting for the non-uniform energy response of the scintillation camera, the energy correction apparatus 10 provides a corrected energy signal $Z_C$ at 60 to the energy window analyzer 48 to thus enable a valid decision to be performed to either accept or reject the image event in accordance with the corrected energy signal $Z_c$ by comparison to a predetermined fixed energy window. Thus, the corrected energy signal $Z_C$ is utilized by the window analyzer 48 to eliminate the effects of non-uniformity of camera response to avoid invalid rejections or acceptances of undesired invalid image events as explained in more detail in the aforementioned U.S. application Ser. No. 096,181 filed by R. E. Arseneau on Nov. 20, 1979.

The on-line energy correction apparatus 10 is also utilized for the correction of non-uniform camera response to sources of radiation having energy levels that are different from the energy level at which the energy correction factors in the memory 54 were first determined. Thus, the energy correction apparatus 10 during on-line diagnostic use can be utilized for sources of different energy levels and sources of multiple energy levels with separate window analyzers such as 90 and 92; the window analyzers having different predetermined fixed energy windows corresponding to the energy levels of the source to accept image events having different energy levels whether the image events are originating from different sources having different energy levels of radiation or from a source having multiple energy level radiation.

Turning now to a more detailed discussion of the spatial distortion apparatus 11 of the present invention and referring now additionally to FIG. 2, the spatial distortion correction apparatus 11 includes a coefficient memory 108 having stored therein distortion correction coefficient factors in a predetermined addressable array for use during the on-line distortion correction of image events.

The correction factors stored in the memory 108 are determined in an off-line test, measurement and analysis phase wherein the spatial distortion characteristics of the scintillation camera are accurately determined for a particular reference energy level. The off-line test, measurement and analysis phase is performed prior to and independently of the on-line image forming diagnostic use of the scintillation camera; the off-line phase being performed by off-line test, measurement and analysis apparatus (not shown). For example, the off-line test, measurement and analysis apparatus is of the type shown in the aforementioned application Ser. No. 051,176 as data storage apparatus 14 and computer 16 in FIG. 1 of that application. It should also be understood that the correction coefficients can be obtained by other methods such as discussed in the Description of the Prior Art of this application.

The results of the off-line test, measurement and analysis phase in a preferred embodiment is a 64×64 array of distortion correction factors defined at predetermined and equally spaced array points of the camera face. Each of the correction coefficient factors at the respective X, Y coordinate position of the camera face represents the correction factor as a vector between the representations of measured image event points and the corrected image position corresponding to the image event point corrected for spatial distortions. In vectorial direction, the distortion correction factor to be applied to an image event point at the $X_A$, $Y_A$ signal outputs of the camera is opposite to that of the measured distortion in the test, measurement and analysis phase, since the measured vector is 180° opposite to that of the correction vector for use in the repositioning of the image event point from the distorted measured points to the corrected image point.

Figure 3:
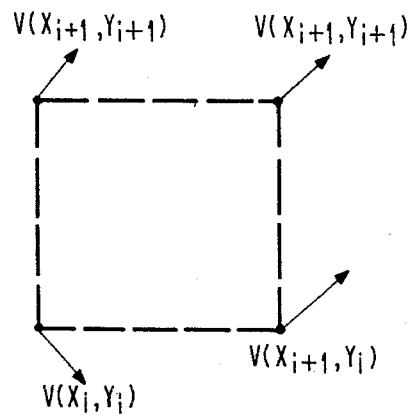
FIG. 3 is a diagrammatic representation of the correction vectors represented by the stored correction factors of the spatial distortion correction apparatus of FIG. 1 at four adjacent array points.

Referring now to FIG. 3, the distortion correction factors are illustrated as vectors at four adjacent array points in a 64×64 array; each vector including an X and Y distortion correction factor. The distortion correction factor in the overall 64×64 array of correction factors can be represented as $\overline{\Delta V}(X,Y)$.

Thus, the four array correction factor vectors of FIG. 3 represent the correction factors at four adjacent points of the 64×64 array as representative points. In a preferred embodiment and for optimum usage of the correction factors $\overline{\Delta V}(X,Y)$, the array is stored in the memory 108 of the spatial distortion correction apparatus 11 as a number of coefficient factors C1 through C8 including the sums and differences of the actual X and Y distortion correction factors in the array $\overline{\Delta V}(X,Y)$ as calculated by the off-line test, measurement and analysis apparatus.

In a specific embodiment, each of the coefficient factors C1 through C8 includes eight bits of information. The manner in which the coefficient factors C1 through C8 are calculated and their correspondence to the X and Y components of the original correction vector factors in the array $\overline{\Delta V}(X,Y)$ in terms of the four adjacent correction vectors of each unit cell of the array at the respective four adjacent array points is as follows:

$C_1 = V_{1x}$ $C_2 = V_{2x} - V_{1x}$ $C_3 = V_{3x} - V_{1x}$ $C_4 = V_{4x} - V_{3x} - V_{2x} + V_{1x}$ $C_5 = V_{1y}$ $C_6 = V_{2y} - V_{1y}$ $C_7 = V_{3y} - V_{1y}$ $C_8 = V_{4y} - V_{3y} - V_{2y} + V_{1y}$

The use by the spatial distortion correction apparatus 11 of the correction factors C1 through C8 to modify the $X_A$, $Y_A$ position coordinate data from the camera will be explained in more detail hereinafter in connection with the detailed structure and operation of the spatial distortion correction apparatus 11.

Referring now again to FIG. 2, the on-line spatial distortion correction apparatus 11 includes an X coordinate analog to digital converter (ADC) 100 and a Y coordinate analog to digital converter (ADC) 102. The analog inputs of the analog to digital converters 100 and 102 are respectively connected to the $X_A$ and $Y_A$ analog data signals of the camera. As image events occur, analog signals are presented at the output lines 26, 28 with the converters 100 and 102 transforming the analog $X_A$, $Y_A$ signals into separate output lines, in a specific embodiment, for each of the X and Y coordinates. The most significant six data lines 104 and 106 of the digital X and Y data respectively from the converters 100 and 102 referred to as XU and YU are connected to the respective X and Y address inputs of the coefficient memory 108.

The coefficient memory 108 outputs the coefficients C1 through C8 in a digital format on data lines 110 in response to the most significant six bit XU and six bit YU address data lines 104, 106, respectively.

Figure 4:
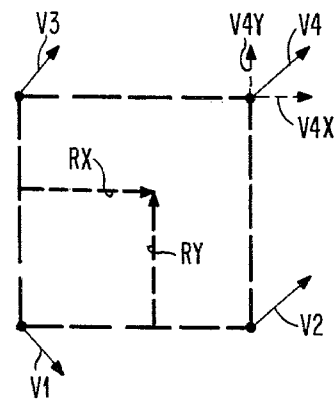
FIG. 4 is a diagrammatic representation useful in understanding the operation of the spatial distortion correction apparatus of FIGS. 1 and 2.

The coefficient factor output lines 110 representing C1-C8 are connected to one digital data input of a correction interpolator 112. The correction interpolator 112 includes at two digital data inputs the least significant six bits of the digital x and y coordinate data XL, YL on output data lines 114 and 116 respectively. The least significant 6 bits of coordinate information XL, YL on lines 114, 116 respectively define the residual functions Rx and Ry as shown in FIG. 4.

In accordance with important aspects of the present invention, the distortion correction modification apparatus 13 of the spatial distortion correction apparatus 11 provides an energy modification signal ZVR to the correction interpolator 112 to modify the stored correction factors C1 through C8 in accordance with the level of the energy signal $Z_c$ at 63. The energy signal $Z_c$ at 63 is connected as an input to the distortion correction modification apparatus 13.

The detailed operation of the distortion correction modification apparatus 13 will be discussed in detail hereinafter in connection with FIG. 5. The detailed operation of the interpolator 112 to provide the image event position correction coordinate data $\Delta X$, $\Delta Y$ as analog signals in accordance with the correction factors C1 through C8 and the lower data bits of image event position coordinate information XL, YL as modified by the energy modification signal ZVR will be discussed in detail hereinafter in connection with FIG. 6. The quantities $R_X$ and $R_Y$ correspond respectively to the lower six bits of X and Y information, XL and YL.

In accordance with important aspects of the present invention, the correction interpolator 112 is arranged to perform the following bivariate interpolation operations and convert the results $\Delta X$, $\Delta Y$ into an analog data form:

$$x = [C_1 + C_2 R_X + C_3 R_Y + C_4 R_x R_y] ZVR$$

$$y = [C_5 + C_6 R_x + C_7 R_y + C_8 R_x R_y] ZVR$$

where $R_x$ and $R_y$ define the coordinates of the image event within the array unit cell. The $\Delta x$ and $\Delta y$ correction factor results of the above operations are provided at respective $\Delta x$ and $\Delta y$ analog outputs of the interpolator 112 to the gates 72 and 74 respectively.

Thus, the $X_A$, $Y_A$ position coordinates of each image event presented by the scintillation camera are corrected by the factors $\Delta x$, $\Delta y$ to provide the corrected position coordinate information $X_C$, $Y_C$ as corrected for spatial distortion characteristics in accordance with the coefficients C1 through C8 for the particular image event from the coefficient memory 108 and also in accordance with the modification of the stored correction coefficients. The modification of the stored correction coefficients is performed in accordance with the energy level $Z_C$ of the image event by the signal ZVR as a function of the difference between the energy level of the image event and the energy level at which the correction coefficients were calculated in the off-line test, measurement and analysis phase.

Figure 5:
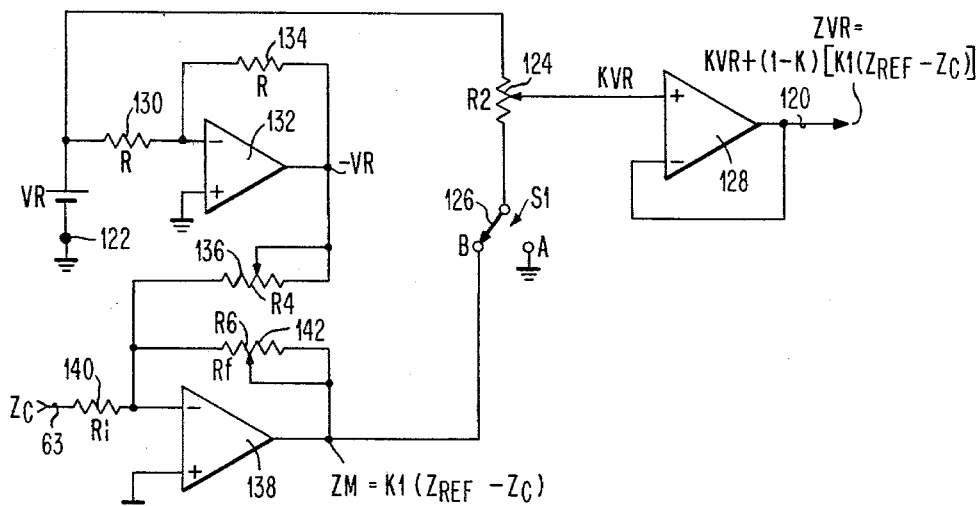
FIG. 5 is a detailed schematic and block diagram representation of the distortion correction modification apparatus of FIGS. 1 and 2.

Referring now to FIG. 5 and a more detailed discussion of the distortion correction modification apparatus 13, the distortion correction modification apparatus 13 derives an energy modification factor ZVR at 120 to appropriately modify the generation of the correction coordinates $\Delta X$, $\Delta Y$ in accordance with the energy level of the image event signal $Z_C$ and the predetermined relationship between the change in spatial distortion characteristics of the camera at energy levels different from the energy reference level $Z_{REF}$ at which the stored correction coefficients were calculated.

Generally, the distortion characteristics of scintillation cameras are greater for image event signals of lower energies as compared to the spatial distortion characteristics for image events of higher energy levels. This has been demonstrated by flood uniformity data using americium 241 having an energy level of 80 Kev and barium 133 having an energy level of 360 Kev. The result of flood uniformity data illustrates that the resultant uncorrected image from americium 241 appears to have high intensity portions or hot spots at the tube centers of the photomultiplier tubes while the barium 133 image has low intensity or cold spots at the tube centers. The effect is the result of the higher spatial distortion causing the image events to be placed closer to the center of the tubes. The general effect is believed to be due at least in part to an increase in light dispersion at high penetration depths in the camera detection apparatus that occurs for higher energy gamma particles. Thus, for scintillation cameras in general, the amount of distortion is inversely proportional to the energy level of the image event signal. From the results of clinical test studies, it appears that the inverse relationship of energy level and spatial distortion is very nearly linear for a wide range of source energy.

Accordingly, it is an important aspect of the present invention to modify the distortion correction factors in an inversely proportional manner to the energy level of the image event to provide appropriate modification of the spatial distortion correction factors for image events having energy levels above and below a center reference energy level $Z_{REF}$ for which the correction factors have been calculated.

In the preferred embodiment illustrated in FIG. 5, the modification factor for energy scaling utilizes a linear inverse proportion relationship between the modification signal ZVR and the energy of the event signal $Z_C$. However, it should be understood that in accordance with other desired specific embodiments for a correction of spatial distortion factors and in accordance with the characteristics of various apparatus, the present invention in specific embodiments utilizes correction functions other than those that are inversely proportional in a linear manner. The various correction functions include non-linear functions and various forms of function generators to achieve a predetermined polynomial relationship between ZVR and $Z_C$ as required from a plot of test data corresponding to the spatial distortions characteristics of the scintillation camera in response to respective source energy levels. Further, it should also be understood that the distortion correction and modification apparatus 13 operates on an image event by image event basis and thus provides an appropriate modification factor ZVR in response to the energy level of a particular image event and thus provides appropriate spatial distortion correction modification during diagnostic use automatically and dynamically without any changes in the camera apparatus being required for sources having different energy levels and sources having multiple energy levels.

Figure 7:
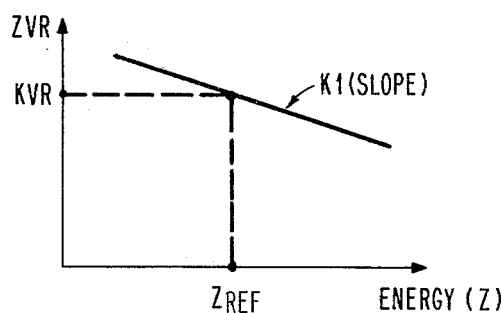
FIG. 7 is a representation of the plot of energy versus energy modification factor ZV illustrating the operation of the dynamic distortion correction modification apparatus of FIG. 5 to modify the correction characteristics of the spatial distortion correction apparatus of FIG. 2.

The relationship between the image event energy signal $Z_C$ at 63 and the energy modification signal ZVR at 120 of the distortion correction modification apparatus 13 is illustrated in FIG. 7. In FIG. 7, the value kVR of function ZVR on the ordinate axis corresponds to the Z reference level $Z_{REF}$ for example for an image event having an energy level of 122 Kev. In a specific example, 122 Kev corresponds to the energy level at which the correction factors in the memory 108 are calculated during the off-line test, measurement and analysis phase.

The distortion correction modification apparatus 13 (FIG. 3) includes a reference supply voltage VR developed with respect to a ground reference potential 122. The reference voltage VR is connected to one end of a potentiometer 124 referred to as R2. The other end of the potentiometer 124 is connected to a common contact of a switch 126 referred to as S1. The switch S1 functions as a single pole-double throw switch between switch contact positions A and B. The switch contact position A is connected to the ground reference 122.

The potentiometer 124 at the wiper arm or tap develops a fractional portion of the voltage VR denoted as the scaled voltage kVR. The voltage kVR at the wiper arm of the potentiometer 124 is connected to the non-inverting input of an amplifier stage 128. The output of the amplifier 128 is connected to the energy modification signal ZVR at 120. The output of the amplifier 128 is also connected to the inverting input of the amplifier 128. With the switch S1 in the A position, the value of signal ZVR is set by the adjustment of the potentiometer R2 for the level kVR of FIG. 7. This value of ZVR=kVR is the desired value of the energy modification signal for the energy reference level $Z_{REF}$, for example 122 kEV, the energy level at which the correction factors are calculated in a specific embodiment.

The reference supply VR is also connected through a resistor 130 to the inverting input of an amplifier 132 connected as an inverting amplifier and supplying an output −VR. The non-inverting input of the amplifier 132 is connected to the ground reference 122. A feedback resistor 134 is connected between the output of the amplifier 132 and the inverting input. The output of the amplifier 132 is connected through a variable resistor 136, also denoted R4, to the inverting input of an amplifier 138.

The inverting input of the amplifier 138 is connected through a resistor 140 denoted $R_i$ to the image event energy signal $Z_C$ at 63. The non-inverting input of the amplifier 138 is connected to the ground reference 122. A variable feedback resistor 142 denoted Rf is connected between the output of the amplifier 138 and the inverting input.

The output of the amplifier 138 represents the function $Z_M = k_1(Z_{REF} - Z_C)$, with the variable resistor R4 being set such that the ratio of the reference VR to the resistor R4 is equal to the quantity $Z_{REF}$ divided by the input resistor $R_i$; $VR/R4 = Z_{REF}/R_i$. The quantity $k_1$ is the gain of amplifier 138 denoted by the quantity $R_f$ divided by $R_i$.

Thus, the amplifier 138 with the resistors adjusted as discussed hereinbefore provides a signal of $Z_M = 0$ volts when the $Z_C$ energy signal is equal to $Z_{REF}$, 122 kev in the specific example. The adjustments as discussed are all accomplished with the switch S1 in the A position.

The output of the amplifier 138 is connected to the B switch contact position of the switch S1. With the switch S1 in the B position, the value of the resistor $R_f$ is adjusted to provide the desired slope $k_1$ of FIG. 7 in accordance with the determined relationship between the energy signal $Z_c$ and the energy modification signal ZVR as established by measurement and analysis. Thus, the energy modification signal ZVR at 120 can be represented as follows:

$$ZVR = kVR + (1-K)[K1(Z_{REF} - Z_C)]$$

With the energy modification signal ZVR thus defined, the spatial distortion correction factors and the corrected output ΔX, ΔY are appropriately modified by the ZVR factor in the interpolator 112 in accordance with the relationships described hereinbefore to provide modification of the spatial distortion correction characteristics of the spatial distortion correction apparatus 11 in accordance with the energy level $Z_C$ of the image event energy signal.

Figure 6:
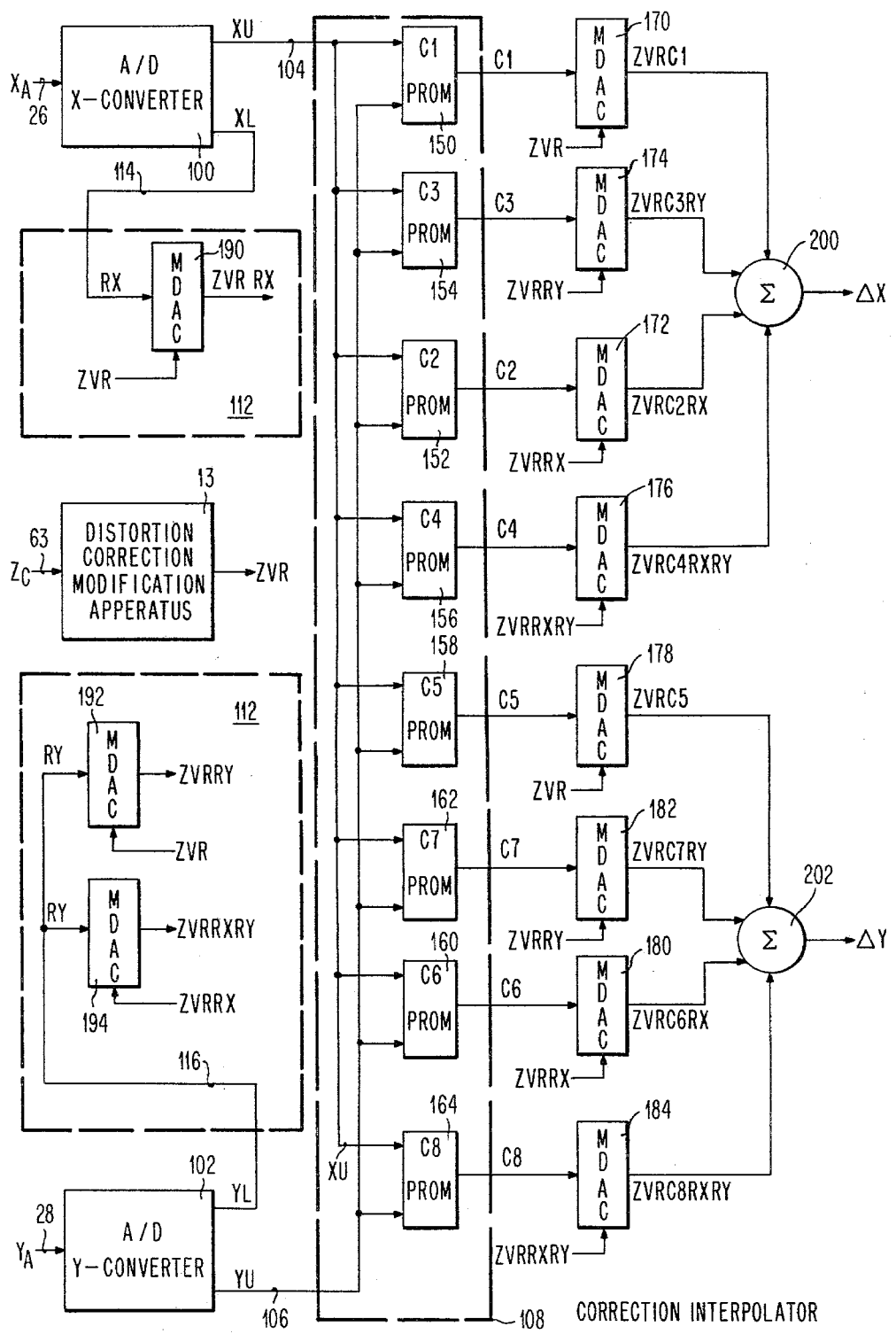
FIG. 6 is a detailed schematic and block diagram representation of the spatial distortion correction modification apparatus of FIGS. 1 and 2.

Referring now to FIG. 6 and considering a discussion of the detailed structure and operation of a preferred embodiment of the spatial distortion correction apparatus 11, the coefficient memory 108 includes eight electronically programmable read only memories (hereinafter PROM), one for each of the correction coefficients C1 through C8. Thus, four PROM stages 150, 152, 154 and 156 respectively provide the X correction factors C1, C2, C3 and C4 and are each addressed by the X and Y coordinate signals representing the upper six data bits of information XU and YU on lines 104 and 106.

Each of the PROM stages 150, 152, 154 and 156 is a 4K by eight bit electronically programmable read only memory (EPROM) that provides the appropriate correction factor in the stored array of correction factors in response to the position coordinate address signal of the image event in X, Y coordinates. The correction factor array is calculated in the off-line test, measurement and analysis phase as a 64×64 array being 4,096 array locations corresponding to 4,096 unit area cells or pixels on the camera face. However, since a 64×64 array forms 4,096 array cells in a square and the camera face is circular, there are substantially less than 4,096 calculated and useable array entries and thus the PROM's 150 through 154 are implemented by a 4K or 4,000 data word memory with each data word having eight bits of information in a specific embodiment.

Similarly, the Y correction factors C5 through C8 are stored in four respective PROM stages 158, 160, 162 and 164. The PROM stages 158, 160, 162 and 164 are responsive to the address inputs on data lines 106 and 104 to output the appropriate correction factors C5 through C8 respectively in response to the image event coordinate position signals.

The interpolator 112 (FIGS. 1 and 2) includes an eight bit multiplying digital to analog converter (hereinafter MDAC) for each of the correction factor outputs from the respective PROM stages 150 through 164 of the coefficient memory 108. Thus, the C1 through C4 correction factor PROM's 150 through 156 are respectively connected to MDAC stages 170, 172, 174 and 176. Similarly, the C5 through C8 correction factor outputs of the PROM's 158 through 164 are respectively connected to MDAC stages 178, 180, 182 and 184.

The multiplying or scaling inputs to each of the MDAC stages are derived by the correction interpolator 112 in accordance with the bivariate interpolation operations and relationships described hereinbefore. Sepcifically, the correction interpolator 112 includes an eight bit MDAC stage 190 having a digital input connected to the lower six bits of X data information XL on lines 114 from the A to D converter 100 referred to as $R_X$. The multiplying or scaling analog input to the MDAC stage 190 is the energy modification signal ZVR. Thus, the output of the MDAC stage 190 represents the analog data function ZVR $R_X$. Similarly, the correction interpolator 112 includes an MDAC stage 192 having a digital input connected to the data lines 116 representing the lower six bits of Y coordinate information YL referred to as $R_Y$. The multiplying or scaling analog input of the MDAC stage 192 is connected to the energy modification signal ZVR.

Thus, the output of the MDAC stage 192 can be represented as ZVR $R_Y$. The analog output ZVR $R_X$ of the MDAC stage 190 is connected to the multiplying analog input of an MDAC stage 194. The digital input to the MDAC stage 194 is connected to the $R_Y$ data on line 116 and thus the MDAC stage 194 provides an output represented by ZVR $R_X R_Y$.

The signal functions from the MDAC stages 190, 192 and 194 represented respectively as ZVR $R_X$, ZVR $R_Y$ and ZVR $R_X R_Y$ are connected to the other MDAC stages 170 through 184 of the interpolator 112 as follows: the ZVR signal is connected to scale the MDAC stages 170 and 178 corresponding to correction factors C1 and C5; the ZVR $R_Y$ function is connected to the multiplying input of the MDAC stages 174 and 182; the ZVR $R_X$ signal is connected to the multiplying input of MDAC stages 172 and 180; and the function ZVR $R_X R_Y$ is connected to the multiplying input of the MDAC stages 176 and 184.

The analog outputs of the MDAC stages 170 through 176 are connected to a summing stage or analog combiner 200 to provide the $\Delta X$ analog correction factor as modified by the energy modification signals ZVR in accordance with the aforementioned relationships for $\Delta X$; the $\Delta X$ signal being supplied to the summing gate 72 (FIG. 1). Similarly, the analog outputs of the MDAC stages 178 through 184 are connected to the summing junction or combining stage 202 to provide the $\Delta Y$ correction factor.

While there has been illustrated and described several embodiments of the present invention, it should be apparent that various changes and modifications thereof will occur to those skilled in the art. For example, in specific embodiments, the spatial distortion correction apparatus 11 and the spatial distortion correction modification apparatus 13 are implemented by various digital and analog computers and function generators to provide a relationship between the ZVR signal and the C1–C8 correction factors to achieve the aforementioned relationship of correction factors $\Delta X$ and $\Delta Y$, C1–C8 and ZVR, performed in the preferred embodiment by the correction interpolator. Further, the preferred embodiment of the spatial distortion correction modification apparatus 13 discussed in connection with FIG. 5 is arranged for stable operation over a wide range of operating conditions and for linearity accuracy. However, other arrangements are also possible to provide the appropriate desired relationship between ZVR and $Z_C$. The spatial distortion correction modification apparatus 13 in the preferred embodiment utilizes the corrected energy signal $Z_C$. However, in other embodiments, the energy signal Z at 40 is also useful to practice the present invention.

Accordingly, it is intended in the appended claims to cover all such changes and modifications as fall within the true spirit and scope of the present invention.

We claim:

1. Spatial distortion correction modification apparatus for a scintillation camera, the scintillation camera providing position coordinate data defining the position of each image event that occurs and an energy signal representing the energy level corresponding to each image event, the spatial distortion correction modification apparatus comprising:

spatial distortion correction means comprising correction factor means having stored therein an addressable array of correction factors, said spatial distortion correction means being responsive to the coordinate position of each image event to generate position coordinate correction data representing the spatial distortion correction factor corresponding to each image event;

modification means responsive to the energy signal of each image event and to said generated position coordinate correction data for providing modified position coordinate correction data in accordance with the variation in spatial distortion characteristics of the scintiallation camera with respect to image event energy level; and means for combining said modified coordinate correction data and said image event position coordinate data to provide corrected position coordinate data representing the coordinates of each image event including spatial distortion correction as modified by the energy level of each image event.

2. The spatial distortion correction modification apparatus of claim 1 wherein said modification means comprises an electrical circuit for generating a spatial distortion correction energy scaling factor signal in response to the energy signal of each image event and means for modifying said position coordinate correction data in accordance with said energy scaling factor signal, the components of said electrical circuit being selected so that said energy scaling factor signal is determined by the relationship between the variation in the spatial distortion characteristics of the scintillation camera as a function of the energy level of the image event energy signal.

3. The spatial distortion correction modification apparatus of claim 1 wherein said modification means comprises function generator means for generating a spatial distortion correction modification signal in response to the image event energy signal and means for modifying said position coordinate correction data in accordance with said modification signal, said modification signal corresponding to the functional relationship between the inherent spatial distortion characteristics of the scintillation camera and the energy level of the image event.

4. The spatial distortion correction modification apparatus of claim 3 wherein said correction factors of said spatial distortion correction means are determined in an off-line test, measurement, and analysis phase prior to an on-line diagnostic use of the scintillation camera at a predetermined representative source energy level for the image events.

5. The spatial distortion correction modification apparatus of claim 4 wherein said predetermined function of said function generator means relates the change in correction factors stored in said spatial distortion correction means with respect to a range of energy level sources different than the predetermined representative source energy level for which the stored correction factors were determined.

6. The spatial distortion correction modification apparatus of claim 1 wherein said correction factors correspond to the spatial distortion characteristics of the scintillation camera at a representative energy level, said modification means comprising modification signal means for generating a modification signal to scale said position coordinate correction data corresponding to each image event in accordance with an inverse proportional relationship between the change in energy level of said image event from said representative energy level at which the correction factors were determined.

7. The spatial distortion correction modification apparatus of claim 1 wherein said spatial distortion correction means comprises memory means for storing said addressable array of correction factors, means for reading out the corresponding correction factor that represents the image area immediately bounding the image event coordinate position, and means responsive to said read-out correction factors and the position of the corresponding image event within the image area immediately bounding the image event for interpolating said read-out correction factors to provide said position coordinate correction data.

8. The spatial distortion correction modification apparatus of claim 7 wherein said stored correction factors are determined for the spatial distortion characteristics of the scintillation camera in response to a first image event energy level, said modification means comprising means for scaling said interpolation of said read out correction factors accounting for the different between the energy level of image events and said first image event energy level.

9. A method for modifying the spatial distortion correction characteristics of a scintillation camera providing image event position coordinate signals and image event energy signals and having spatial distortion correction apparatus, the spatial distortion correction apparatus of the scintillation camera providing spatial distortion correction of the image event position coordinate signals from the scintillation camera to provide corrected image event coordinate signals in accordance with stored spatial distortion correction factors, the spatial distortion correction factors stored in the scintillation camera being determined during an off-line phase in response to image events having a predetermined reference energy level; the method comprising;
  determining the variation in spatial distortion characteristics of the scintillation camera for a range of image event energy levels different than the reference energy level during the off-line phase to provide a spatial distortion versus energy level relationship;
  operating said scintillation camera during an on-line diagnostic phase;
  correcting the resultant image event coordinate position signals obtained during said on-line diagnostic phase to provide corrected image event coordinate signals by means of the spatial distortion correction apparatus; and
  modifying said distortion correction performed by the spatial distortion correction apparatus in accordance with the image event energy signals and said spatial distortion versus energy level relationship obtained in said off-line determining step to provide modified image event coordinate signals as modified by the change in spatial distortion characteristics of the scintillation camera in response to image event energy signals having different energy levels than said reference energy level.

* * * * *